United States Patent [19]
Goto et al.

[11] Patent Number: 5,892,197
[45] Date of Patent: Apr. 6, 1999

[54] CONTROL APPARATUS FOR RESISTANCE WELDING MACHINE

[75] Inventors: Yasuhiro Goto, Kawanishi; Koji Fujii; Makoto Ryudo, both of Osaka, all of Japan

[73] Assignee: Matsushita Electric Industrial Co., Ltd., Osaka, Japan

[21] Appl. No.: 770,299

[22] Filed: Dec. 20, 1996

[30] Foreign Application Priority Data

Dec. 21, 1995 [JP] Japan .................................. 7-332994
Feb. 7, 1996 [JP] Japan .................................. 8-020881

[51] Int. Cl.⁶ .................................................. B23K 11/24
[52] U.S. Cl. ............................................................ 219/110
[58] Field of Search .................................. 219/108, 109, 219/110, 117.1

[56] References Cited

U.S. PATENT DOCUMENTS

| | | | |
|---|---|---|---|
| 4,343,980 | 8/1982 | Stanya et al. | 219/110 |
| 4,596,917 | 6/1986 | Nied et al. | |
| 5,343,011 | 8/1994 | Fujii et al. | 219/109 |
| 5,436,422 | 7/1995 | Nishiwaki et al. | 219/110 |
| 5,575,934 | 11/1996 | Takakuwa et al. | 219/109 |

FOREIGN PATENT DOCUMENTS

| | | |
|---|---|---|
| 0581315 | 2/1994 | European Pat. Off. . |
| 63-180384 | 7/1988 | Japan . |
| 1-241385 | 9/1989 | Japan . |
| 4-178275 | 6/1992 | Japan . |
| 5-337655 | 12/1993 | Japan . |
| 5-337657 | 12/1993 | Japan . |
| 7-185835 | 7/1995 | Japan . |

*Primary Examiner*—Clifford C. Shaw
*Attorney, Agent, or Firm*—Pollock, Vande Sande & Amernick

[57] ABSTRACT

A control apparatus for a resistance welding machine comprises a welding current detecting device for detecting a welding current, interelectrode voltage detecting device for detecting an interelectrode voltage, a calculating section for predicting a nugget growth or estimating an expulsion & surface-flash generation probability, and control section for controlling the welding current so that the nugget growth or the expulsion & surface-flash generation probability can be adjusted to a predetermined value.

12 Claims, 9 Drawing Sheets

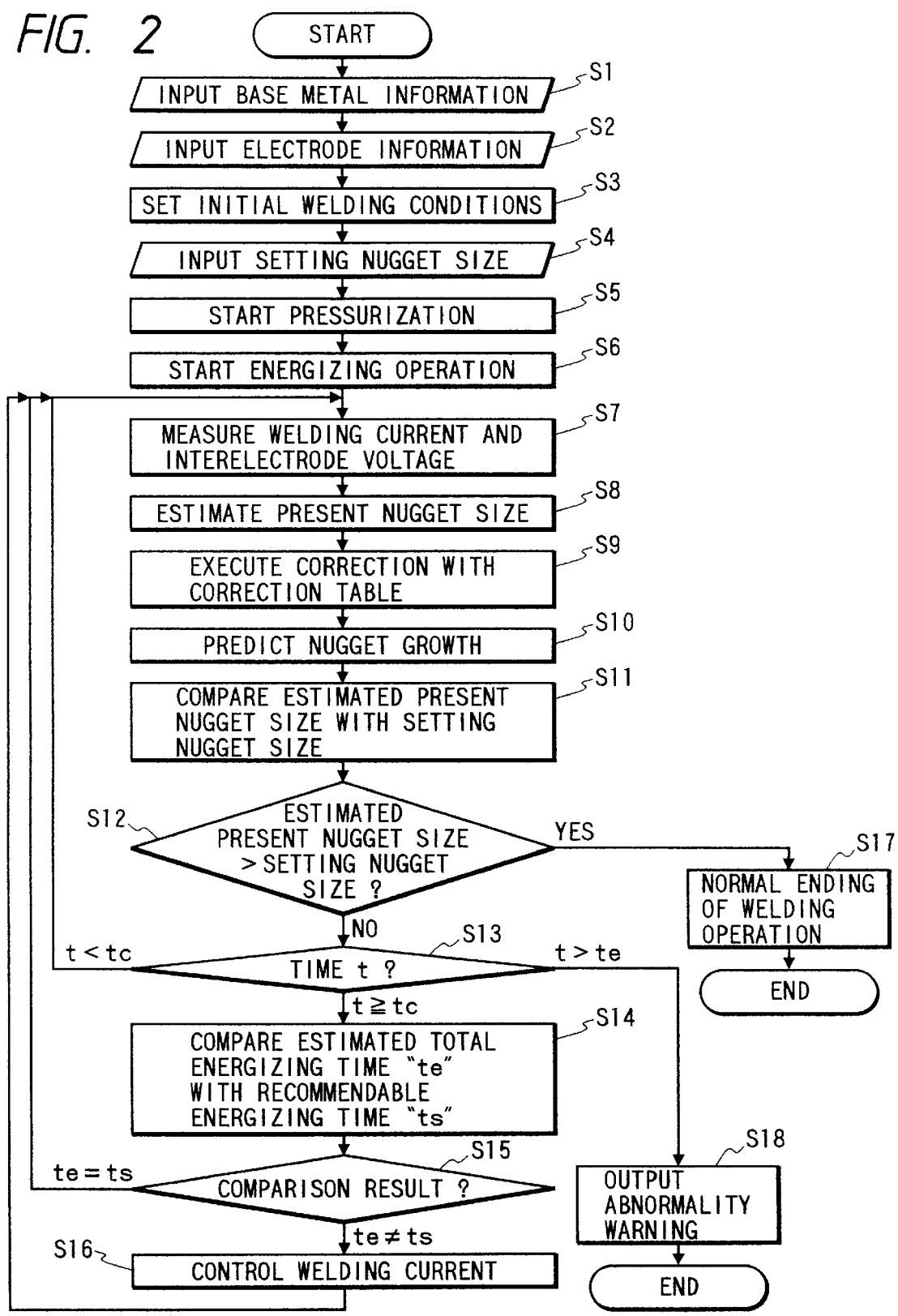

CONTROL APPARATUS FOR RESISTANCE WELDING MACHINE

BACKGROUND OF THE INVENTION

1. Field of the Invention

The present invention relates to a control apparatus for a resistance welding machine, especially to a control apparatus for a spot welding machine.

2. Prior Art

In a resistance welding machine used for lap welding of steel plates or the like, the three principal parameters to stabilize the welding quality are a welding current, an energizing time, and an electrode pressurizing force. It is generally known that these parameters are feedback controlled instead of by the dial setting of recommendable conditions for each base metal based on expertise and experiences.

Enhancement of the welding quality has been recently requested. To satisfy such a requirement, Unexamined Japanese Patent Application No. 4-178275, published in 1992, discloses a technology for controlling a welding operation by directly monitoring a nugget, since the nugget growth reflects the result of the welding operation.

Hereinafter, the control apparatus of a conventional resistance welding machine disclosed in the Unexamined Japanese Patent Application No. 4-178275 will be explained with reference to the accompanied drawing.

In FIG. 4, reference numeral 21 represents a power source unit for a resistance welding machine, and reference numeral 22 represents a controller for the welding power source unit 21. Reference numeral 23 represents a welding current detecting device. Reference numeral 24 represents a secondary conductor. Reference numeral 25 represents a lower arm. Reference numeral 26 represents a base metal to be welded. Reference numeral 27 represents a pair of electrodes. Reference numeral 28 represents a pressurizing cylinder.

Reference numeral 29 represents an upper arm. Reference numeral 30 represents an electropneumatic proportional valve. Reference numeral 31 represents a pressure sensor. Reference numeral 32 represents a controller for the electropneumatic proportional valve 30. Reference numeral 33 represents a cable which detects an interelectrode voltage (i.e. a voltage between electrodes 27). Reference numeral 34 represents a distance detector which detects an amount of shift of electrodes 27.

Reference numeral 35 represents a signal processing section which acts as a hardware circuit for processing signals representing the electrode pressurizing force, the electrode shift amount, the interelectrode voltage and the welding current. Reference numeral 36 represents an estimating section which estimates a nugget size and a heat input density. And, reference numeral 37 represents a control signal generating section which generates control signals for the welding current and the electrode pressurizing force.

The above-described control apparatus of the conventional resistance welding machine will be explained with reference to a flow chart shown in FIG. 5. First, the plate thickness of base metal 26, the number of metal plates to be lapped or stacked, and the material information of base metal 26 are respectively entered (step 101) in the control apparatus. Next, a welding operation is started (step 102). Prior to an energizing operation, electrodes 27 are pressurized to confirm the total thickness of metal plates. Then, a relationship between the actual pressurizing force and the shift amount of electrodes 27 is measured. Based on the measuring result, an electrode pressurizing force value is set to an appropriate value to make the metal plates fit aginst each other sufficiently (step 103).

Referring to the lapping number of metal plates, a standard heat input density pattern and a standard energizing diameter increase pattern are selected respectively (step 104). The standard heat input density pattern and the standard energizing diameter increase pattern are both determined in advance in accordance with numerical calculations and experiments. Selection of these two standard patterns is essential for realizing an effective control of the variation of the heat input density and the increase of the energizing diameter during the actual welding operation. More specifically, both the heat input density and the energizing diameter are controlled to be equalized to the values designated by the selected standard patterns.

Next, the energizing operation is started (step 105). Then, a momentary change of a nugget diameter is monitored through a simulation of numerical calculations while performing a heat input density control later described (step 112). When the estimated nugget diameter becomes larger than a required nugget diameter (step 113), the energizing operation is terminated (step 114). Through this operation, it becomes possible to realize an excellent welding portion with reliability.

Next, the simulation of numerical calculations for obtaining the nugget diameter and the heat input density control will be explained. An interelectrode voltage and a welding current value are detected during the welding operation after starting the energizing operation (step 106). The detected values of the interelectrode voltage and the welding current are substituted into the following equation (1) to calculate the energizing diameter (step 107).

$$dc = \sqrt{\frac{4}{\pi} \cdot \frac{\rho m \cdot A \cdot \Sigma hi}{Rtip - R0}} \quad (1)$$

where "dc" is a representative energizing diameter of a welding portion, "$\rho m$" is a mean specific resistance of the welding portion, "A" is a correction coefficient relating to current spread, "$\Sigma hi$" is a total plate thickness, "Rtip" is an interelectrode resistance (=Vtip/I, when "Vtip" is an interelectrode voltage and "I" is a welding current), and "R0" is an electrode resistance.

In the above-described equation (1), the mean specific resistance "$\rho m$" of the welding portion is determined based on a mean temperature in the welding portion. When the energizing operation is started (t=0), the mean specific resistance "$\rho m$" is equal to a specific resistance "$\rho m0$" at the room temperature. Temperature change during a tiny time interval $\Delta t$ can be regarded as negligible. Next, the energizing diameter thus calculated and the detected welding current value are substituted into the following equation (2) to estimate a temperature distribution to be obtained after a time elapse of $\Delta t$.

$$c\sigma \frac{\partial T}{\partial t} = \frac{\partial}{\partial x}\left(K \frac{\partial T}{\partial x}\right) + \rho \delta^2 \quad (2)$$

where "c" is a specific heat, "$\sigma$" is a density, "K" is a heat conductivity, "$\delta$" is a current density ($\equiv AI/(\pi \cdot dc^2/4)$), "T" is a temperature, "t" is a time, "x" is a distance in the direction of plate thickness, and "$\partial$" is a partial derivative symbol.

From this temperature distribution, "$\rho m1$" is obtained as a mean specific resistance to be obtained after a time elapse of $\Delta t$. By substituting "$\rho m1$" into the equation (1), an energizing diameter to be obtained after a time elapse of Δt can be calculated. In this manner, momentary values of the energizing diameter, temperature distribution, and heat input density are successively obtained during a duration from start of the energizing operation to a certain time (step 110). Furthermore, a correct nugget diameter can be estimated by taking into account a heating start-up delay time at each radial position. Then, the welding current and the electrode pressurizing force are controlled to equalize the energizing diameter and heat input density obtained here to the preferable standard heat input pattern and preferable standard energizing diameter increase pattern selected in step 104 (step 111).

A detection of an electrode shift amount (step 108) is necessary to confirm and correct (step 109) an error of the energizing diameter calculated in step 107, which is likely to be caused in the initial stage of the energizing operation. The detected electrode shift amount is substituted into the following equation (3) to calculate a mean temperature of the welding portion. Then, the mean temperature thus obtained is used to correct the mean temperature distribution at the present time which is previously obtained.

$$Tm = B \cdot \frac{\Delta l}{3 \cdot \alpha m \cdot \Sigma hi} \quad (3)$$

where "Tm" is a mean temperature of the welding portion, "Δl" is an electrode shift amount, "αm" is a mean value of linear expansion coefficient, and "B" is a proportional constant.

However, according to the above-described conventional arrangement, it is necessary to successively identify the mean temperature and the energizing diameter of the welding portion during the welding operation, and it is complicated to determine the standard energizing diameter increase pattern and the standard heat input density pattern to compare them with the identified energizing diameter and the heat input density obtained from this energizing diameter. Furthermore, it is necessary to perform an adaptive control in real time for adjusting the welding current and the electrode pressurizing force based on the comparison result of the energizing diameter and the heat input density in connection with the standard energizing diameter increase pattern and the standard heat input density pattern. Therefore, the control apparatus becomes complicated and expensive.

Furthermore, in the resistance welding machine used for lap welding of steel plates or the like, increasing a heat input amount to a welding portion is important to increase the welding strength. The factors determining the heat input amount are a welding current, an energized portion resistance, and an energizing time. Especially, when the number of welding points is increased, the tip of an electrode is worn and deformed. This leads to deterioration of the welding strength. Thus, it becomes necessary to further increase the heat input amount to the welding portion. However, increasing the heat input amount provokes generation of expulsion & surface-flash. It is well known that, when the expulsion & surface-flash is once generated, the welding strength is extremely reduced and the appearance or configuration of the welding portion is terribly worsened.

From the enhancement of the welding quality, the recent development of the welding technology makes it possible to obtain a sufficient size of a nugget while suppressing the generation of the expulsion & surface-flash to a minimum level. For example, it is effective to intentionally reduce the welding current during a start-up period of a welding operation and also during the second-half period of the welding operation, because the expulsion & surface-flash tends to be caused in these specific durations. Meanwhile, an increase is allowed in the welding current largely during an intermediate period of the welding operation, because the expulsion & surface-flash seldom occurs in this intermediate duration.

In view of the foregoing, a pattern welding current control and a constant-power welding method are already proposed, as disclosed in Unexamined Japanese Patent Application No. 63-180384, published in 1988. Furthermore, there is a method of stopping the energizing operation as soon as the generation of the expulsion & surface-flash is detected by the sudden change of a pressurizing force or a welding current as disclosed in Unexamined Japanese Patent Application No. 1-241385, published in 1989.

Moreover, for a plurality of welding points which are continuously welded, there is a method of varying a welding current for the next welding point when an expulsion & surface-flash is detected during a welding operation for a certain welding point, as disclosed in Unexamined Japanese Patent Application No. 5-337655, published in 1993.

However, according to the above-described conventional technologies, the following problems arise. According to the pattern welding current control or the constant-power welding method, the generation rate of the expulsion & surface-flash can be reduced to a certain degree compared with the constant-current welding method. However, it is inherently impossible to obtain a nugget having a maximum strength without causing any expulsion & surface-flash. Meanwhile, according to the method of stopping the energizing operation immediately upon detecting the generation of expulsion & surface-flash, it necessarily generates some expulsion & surface-flash. Furthermore, according to the method of varying the welding current for the next welding point when any generation of the expulsion & surface-flash is detected in a present welding operation, it is impossible to prevent the generation of the expulsion & surface-flash during the present welding operation. In short, there was no method capable of perfectly preventing the generation of the expulsion & surface-flash.

SUMMARY OF THE INVENTION

Accordingly, in view of above-described problems encountered in the prior art, a principal object of the present invention is to provide a simple and cheep control apparatus for a resistance welding machine capable of surely obtaining a stable and preferable nugget.

To accomplish this and related objects, the present invention provides a control apparatus for a resistance welding machine, comprising setting nugget input means for setting a desirable nugget size, present nugget estimating means for estimating a present nugget size, nugget growth predicting means for predicting a nugget growth curve after a present time and a required energizing time for the predicted nugget growth, current control judgement means for generating a control signal to equalize the required energizing time with a recommendable energizing time, and control means for controlling the welding current in accordance with the control signal.

The above-described arrangement allows a welding machine operator to input a required nugget as a welding condition through the setting nugget input means instead of entering the welding current and the energizing time. When the energizing operation is started, the present nugget estimating means estimates a present size of the nugget momentarily growing during the welding operation. The nugget growth predicting means memorizes the present nugget size momentarily estimated by the present nugget estimating means as growth hysteresis, predicts the nugget growth curve after the present time based on the obtained growth hysteresis, and compares the nugget growth curve with the setting nugget to predict the required energizing time.

The current control judgement means generates the control signal used for controlling the welding current so as to equalize the required energizing time with the recommendable energizing time. And, the control means controls the welding current according to this control signal, and stops the energizing operation in response to the deenergizing signal. Accordingly, the present invention allows the welding machine operator to surely and simply get the predetermined nugget having a required size by merely inputting the required nugget information.

Furthermore, the present invention has an object to provide a control apparatus for a resistance welding machine which precisely controls the heat input amount to obtain a nugget having a maximum strength while preventing the heat input amount from exceeding a critical point in view of the generation of expulsion & surface-flash.

To accomplish this and related objects, the present invention provides a control apparatus for a resistance welding machine, comprising welding current detecting means for detecting a welding current, interelectrode voltage detecting means for detecting an interelectrode voltage, energy distribution estimating means for estimating an energy distribution in an energized portion based on time variations of the welding current and the interelectrode voltage detected by the welding current detecting means and the interelectrode voltage detecting means, and expulsion & surface-flash generation probability estimating means for estimating an expulsion & surface-flash generation probability based on the energy distribution obtained by the energy distribution estimating means.

According to this arrangement, the energy distribution estimating means estimates an energy distribution in an energized portion based on time variations of the welding current and the interelectrode voltage detected by the welding current detecting means and the interelectrode voltage detecting means. The expulsion & surface-flash generation probability estimating means estimates an expulsion & surface-flash generation probability based on the energy distribution obtained by the energy distribution estimating means.

According to preferred embodiment of the present invention, in addition to the above-described arrangement, there is heat input control means for controlling a welding heat input amount so as to maintain the expulsion & surface-flash generation probability at a predetermined value. With this arrangement, the heat input amount can be increased to an allowable upper limit while preventing the generating any expulsion & surface-flash.

Alternatively, it is preferable that the expulsion & surface-flash generation probability estimating means comprises expulsion & surface-flash generation time predicting means for predicting an expulsion & surface-flash generation time. And, the heat input control means controls a welding heat input amount so that the expulsion & surface-flash generation time is in a predetermined period of time after finishing a welding operation. With this arrangement, the heat input amount can be increased to an allowable upper limit while preventing the generating any expulsion & surface-flash.

Moreover, it is preferable that the heat input control means comprises optimum welding current estimating means for generating a control signal representing an optimum welding current value and welding current control means for controlling the welding current in accordance with the control signal produced from the optimum welding current estimating means.

Still further, it is preferable that there is display means for displaying at least one of the expulsion & surface-flash generation probability estimated by the expulsion & surface-flash generation probability estimating means, the expulsion & surface-flash generation time predicted by the expulsion & surface-flash generation time predicting means, and a processing result of the data relating to expulsion & surface-flash generation probability and the expulsion & surface-flash generation time.

BRIEF DESCRIPTION OF THE DRAWINGS

The above and other objects, features and advantages of the present invention will become more apparent from the following detailed description which is to be read in conjunction with the accompanying drawings, in which:

FIG. 2 is a flow chart showing an operation of the control apparatus of the first embodiment of the present invention;

DETAILED DESCRIPTION OF THE PREFERRED EMBODIMENTS

Figure 1:
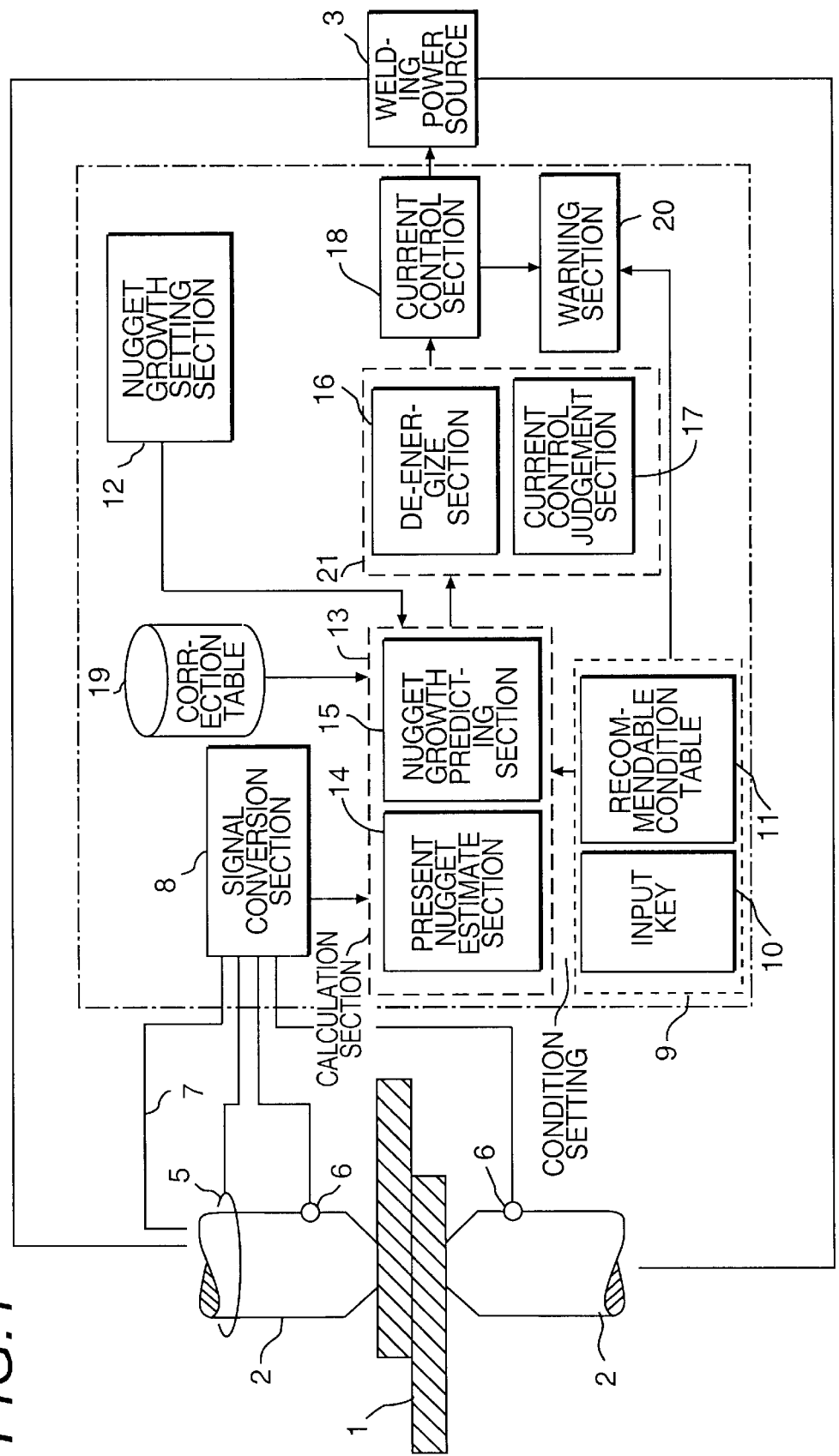
FIG. 1 is a block diagram showing an arrangement of a control apparatus for a resistance welding machine in accordance with a first embodiment of the present invention.

Preferred embodiments of the present invention will be explained in greater detail hereinafter with reference to the accompanying drawings. Identical parts are denoted by the same reference numerals throughout the views.

Hereinafter, a first embodiment of the present invention will be explained with reference to the accompanying drawings.

In FIG. 1, reference numeral 1 represents base metals to be welded, and reference numeral 2 represents a pair of welding electrodes which holds or clamps the base metals 1 and is pressurized by an appropriate pressurizing mechanism (not-shown). Reference numeral 3 represents a welding power source unit. Reference numeral 4 represents a control apparatus. Reference numeral 5 represents a toroidal coil which detects a welding current. Reference numeral 6 represents an interelectrode voltage detecting wire. Reference numeral 7 represents a distance detector which detects a clearance between welding electrodes 2. Reference numeral 8 represents a signal conversion section which converts the output signals of toroidal coil 5, interelectrode voltage detecting wire 6, and distance detector 7 into data signals processible in the control apparatus 4.

Reference numeral 9 represents a condition setting section comprising an input key 10 and a recommendable condition table 11 which memorizes recommendable welding conditions for various metals. Reference numeral 12 represents a nugget setting section which allows a welding machine operator to input a desirable nugget size. Reference numeral 13 represents a calculating section consisting of a present nugget estimating section 14 and a nugget growth predicting section 15. Reference numeral 16 represents a deenergizing judgement section. Reference numeral 17 represents a current control judgement section. The deenergizing judgement section 16 and the current control judgement section 17 constitute a judgement section 21.

Reference numeral 18 represents a control section which performs the current control of the present invention in accordance with a phase control using a thyrister. Furthermore, reference numeral 19 represents a correction table which is used for correcting the present nugget diameter estimated by the present nugget estimating section 14 in accordance with information relating to the base metal to be welded. Reference numeral 20 represents an abnormality warning section comprising a red indicator lamp and a buzzer.

An operation of the above-described control apparatus for the resistance welding machine will be explained with reference to FIG. 2.

First, the information (material, plate thickness, lapping number, etc) relating to base metal 1 given in the design package or specification are entered through input key 9 of condition setting section 9 (step 1). And, the information (material, tip configuration, etc.) relating to the used welding electrodes 2 are entered through input key 9, too (step 2). The condition setting section 9 sets initial welding conditions with reference to the recommendable condition table 11 (step 3). Next, a desirable nugget diameter, required for guaranteeing the welding quality, is entered through nugget setting section 12 (step 4).

After finishing the above-described preparation, base metals 1 are held or clamped between upper and lower welding electrodes 2 and pressurized to start the welding operation (step 5). The welding current required immediately after starting the welding operation is given by the initial welding conditions previously set (step 6). After starting energizing process for the welding operation, the toroidal coil 5, interelectrode voltage detecting wire 6, and distance detector 7 detect momentary values of the welding current, the interelectrode voltage and the interelectrode distance, respectively. The signal conversion section 8 receives these detected data and converts them into data signals which are later sent to the calculating section 13 (step 7).

Calculating section 13 operates in the following manner. First, the present nugget estimating section 14 estimates a present nugget diameter momentarily according to the conventional method (step 8). More specifically, the present embodiment estimates the nugget diameter based on the energizing diameter, temperature distribution and heat input density obtained through the processing similar to the steps 106 through 110 of FIG. 5. In the estimation of the nugget diameter, a correction is performed based on the entered information relating to the base metal 1 by referring to the correction table 19 (step 9). The present nugget diameter size momentarily estimated by the present nugget estimating section 14 is sent to the deenergizing judgement section 16 and the current control judgement section 17.

The deenergizing judgement section 16 compares the momentary value of the present nugget diameter with the desirable nugget diameter set in the step 4 (step 11), and generates a deenergizing signal when the present nugget diameter becomes equal to the desirable nugget diameter ("YES" in step 12). This deenergizing signal is sent to the control section 18. Responding to this deenergizing signal, the control section 18 deactivates the thyrister to shut the welding current and terminate the welding operation (step 17).

The abnormality warning section 20 compares a total energizing time, corresponding to a time interval from the start of the energizing operation to the generation of the deenergizing signal, with a recommendable energizing time being set as one of initial welding conditions by the condition setting section 9 (step 13). When the comparison result is not within a predetermined region, it is considered that the condition of the welding portion is extremely bad or there is an abnormality such as severe wear of the welding electrodes 2. Then, the warning is generated by activating the buzzer and the red indicator lamp (step 18).

On the other hand, nugget growth predicting section 15 successively memorizes the present nugget size after the energizing operation is started and obtains a nugget growth hysteresis curve (step 10), and subsequently the nugget growth hysteresis curve is extrapolated to obtain a nugget growth predicting curve which predicts the nugget growth after the present time (step 14).

Figure 3A:
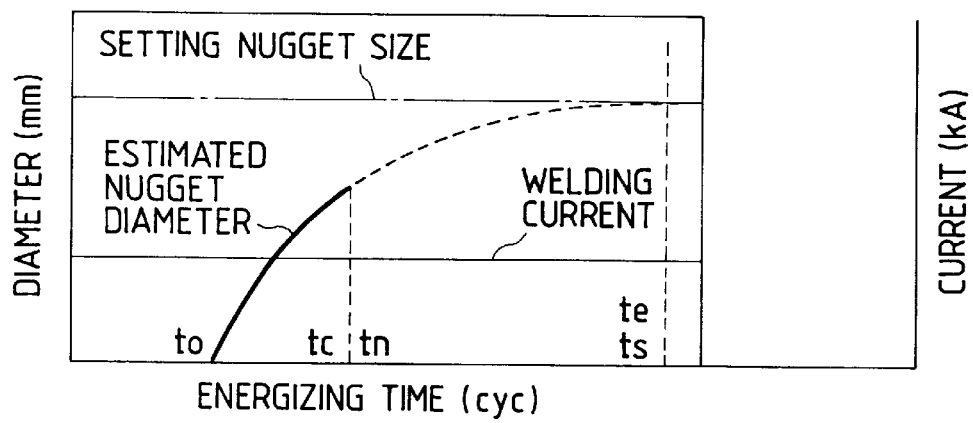
FIG. 3A is a characteristic view showing an ideal relationship between a nugget growth curve and a welding current in accordance with the first embodiment of the present invention, wherein no welding current control is necessary.
Figure 3B:
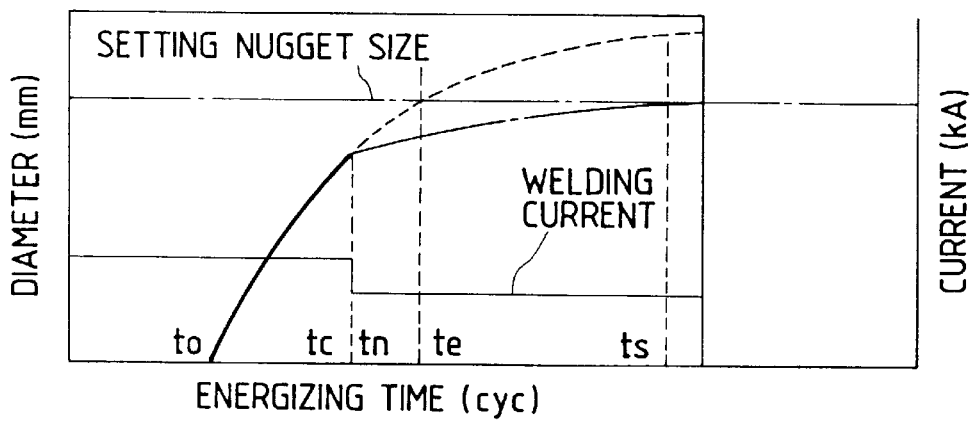
FIG. 3B is a characteristic curve showing a relationship between a nugget growth curve and a welding current in accordance with the first embodiment of the present invention, obtained as a result of a first welding current control.
Figure 3C:
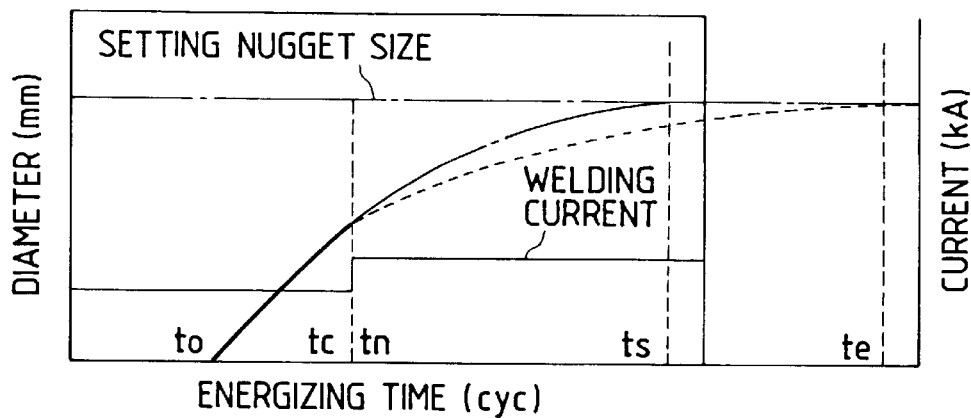
FIG. 3C is a characteristic curve showing a relationship between a nugget growth curve and a welding current in accordance with the first embodiment of the present invention, obtained as a result of a second welding current control.
Figure 4:
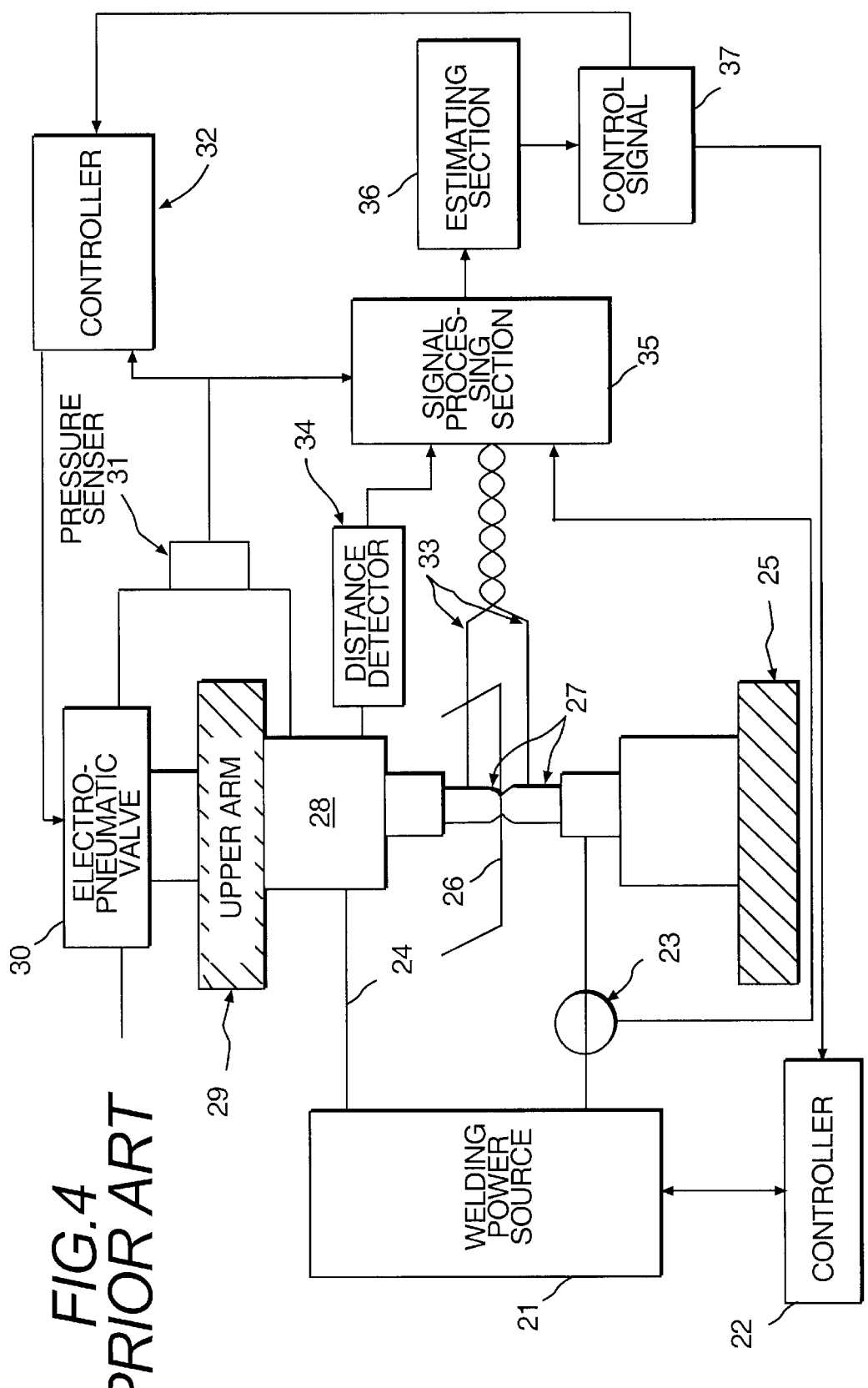
FIG. 4 is a block diagram showing an arrangement of a conventional control apparatus for a resistance welding machine.

FIGS. 3A, 3B and 3C show the examples of the nugget growth curves. In FIGS. 3A, 3B and 3C, each abscissa represents the energizing time, while each ordinate represents the nugget diameter and the welding current. In these examples, the prediction is executed at the present time "tn". The nugget growth hysteresis curve, having been obtained during a past time duration from the start of the energizing operation to the present time "tn", is shown by a solid line. Meanwhile, the growth predicting curve, to be obtained after the present time "tn", is shown by a dotted line.

The current control judgement section 17 estimates a welding completion time by overlapping a straight line parallel to the abscissa on the nugget growth predicting curve. The ordinate value of this straight line corresponds to the desirable nugget diameter being set in the earlier step.

From this estimation, a total energizing time "te" is obtained. Then, the estimated total energizing time "te" is compared with the recommendable energizing time "ts" being set as one of initial welding conditions by the condition setting section 9, thereby checking whether the present nugget growth is in good order.

As shown in FIG. 3A, when the ratio of the estimated total energizing time "te" to the recommendable energizing time "ts" is regarded as substantially 1 or within a predetermined acceptable range, the welding operation is continued and completed without performing corrections or adjustments (step 15→step 7).

When the ratio of the estimated total energizing time "te" to the recommendable energizing time "ts" is smaller than 1 as shown in FIG. 3B, it is considered that the present welding current is larger than the optimum value. On the other hand, when the ratio of the estimated total energizing time "te" to the recommendable energizing time "ts" is larger than 1 as shown in FIG. 3C, it is considered that the present welding current is smaller than the optimum value.

Meanwhile, when the present time "tn" reaches a predetermined control time "tc" (step 13), the current control judgement section 17 generates a current control signal based on the above-described judgement result (step 16).

More specifically, in response to this current control signal, the welding current is increased or decreased such that the nugget growth curve changes as shown by an alternate long and short dash line in FIGS. 3B or 3C. This current control signal is sent to the control section 18. The control section 18 controls the conducting phase of the thyrister in response to this current control signal, so as to execute the welding current decreasing control (i.e. first control corresponding to FIG. 3B or the welding current increasing control (i.e. second control corresponding to FIG. 3C. With this welding current decreasing or increasing control, the nugget growing process is corrected appropriately. The welding operation of high quality is realized.

By repeating the above-described welding current control during one welding period, the nugget growth process will be further accurately regulated. However, from the fact that the nugget growth predicting curve is obtained by extrapolating the growth hysteresis curve, the extrapolating calculation will be complicated if the welding current is varied during the past duration from the start of the energizing operation to the predicting time "tn". Thus, the accuracy in predicting the nugget growth will be deteriorated significantly. According to the verification result by the inventors, an appropriate result is obtained when the above-described current control is performed once or twice during one welding operation. Ordinarily, a satisfactory welding quality can be obtained by performing only one welding current control. Thus, this embodiment performs only one welding current control per welding operation.

Correcting and predicting accuracy of the nugget growth predicting curve is improved as the welding operation progresses. Hence, it is not effective to execute the judgement of the nugget growth process at a too earlier stage of the total energizing period of time. On the other hand, it is readily understood that the excellent welding quality can be obtained by performing the welding current control as early as possible. According to the verification result, a preferable result is obtained when the control time "tc" is in a range from ⅓ to ½ of the recommendable energizing time "ts".

The above-described abnormality warning section 20 decides that the condition of the welding portion on the base metal is extremely bad or there is an abnormality such as severe wear of the welding electrodes when the ratio of the estimated total energizing time "te" to the recommendable energizing time "ts" is extremely far from 1, and generates a warning by activating the buzzer and the red indicator lamp in accordance with the judgement result.

As explained above, the first embodiment of the present invention comprises input key 10 and recommendable condition table 11 cooperatively constituting the condition setting section 9, as well as the nugget setting section 12, the present nugget estimating section 14, the nugget growth predicting section 15, the deenergizing judgement section 16, the current control judgement section 17, the control section 18, the correction table 19, and the abnormality warning section 20.

In other words, the present embodiment allows each welding machine operator to input a required nugget size directly through the nugget setting section 12 for setting the welding conditions instead of inputting various data for the welding conditions, including the welding current and the energizing time, with reference to a predetermined welding condition table and further without requiring expert correction thereon. Thus, it becomes possible to reduce the burden of the welding machine operator, such as requisite expertise.

And, the control of welding current is executed by predicting the nugget growth process during the welding operation and judging the acceptability thereof.

Furthermore, when the nugget has grown to the required nugget size, the energizing operation is stopped automatically. Hence, it becomes possible to assure a preferable growth of the nugget so as to have a predetermined strength.

In FIG. 1, the welding current is detected by toroidal coil 5. However, it is possible to use a current shunt. Moreover, it is possible to detect the welding current by measuring the primary current of the welding power source transformer.

According to the first embodiment, the condition setting section 9 automatically sets the initial welding conditions with reference to the recommendable condition table 11. However, it is of course possible for the welding machine operator to directly input the initial welding conditions by manual operation.

Furthermore, according to the first embodiment, the welding current is adjusted based on a constant-current control. However, it is possible to adopt a well-known pattern control utilizing the up-slope in the starting phase of the energizing operation or a current increase after the nugget growth is stabilized.

According to the first embodiment, it is preferable to perform the current control once or twice during one welding operation. However, it is needless to say that the total number of the current controls per welding operation can be flexibly changed. Yet further, it is possible to skip the current control during the present welding operation. In this case, after completing the present welding operation, the setting value of the welding current is changed for the next welding operation performed for another welding point.

According to the first embodiment, it is preferable that the control time "tc" is in the range from ⅓ to ½ of the recommendable energizing time "ts". However, the present invention does not prohibit to set the control time "tc" to be smaller than ⅓ of recommendable energizing time "ts" or to be larger than ½ on the other hand. Furthermore, it is possible to set the control time "tc" to be a specific time reachable by counting a predetermined value from the moment the nugget growth is first confirmed (i.e. t0 in FIGS. 3A, 3B and 3C).

Still further, according to the first embodiment, deenergizing judgement section 16 compares the present nugget size with the setting nugget size to generate the deenergizing signal. However, the similar effect will be obtained by uniformly starting the deenergizing operation at the time the recommendable energizing time "ts" has elapsed, because the present embodiment can control the increase-or-decrease of the welding current adequately so as to obtain an optimum welding current.

Figure 5:
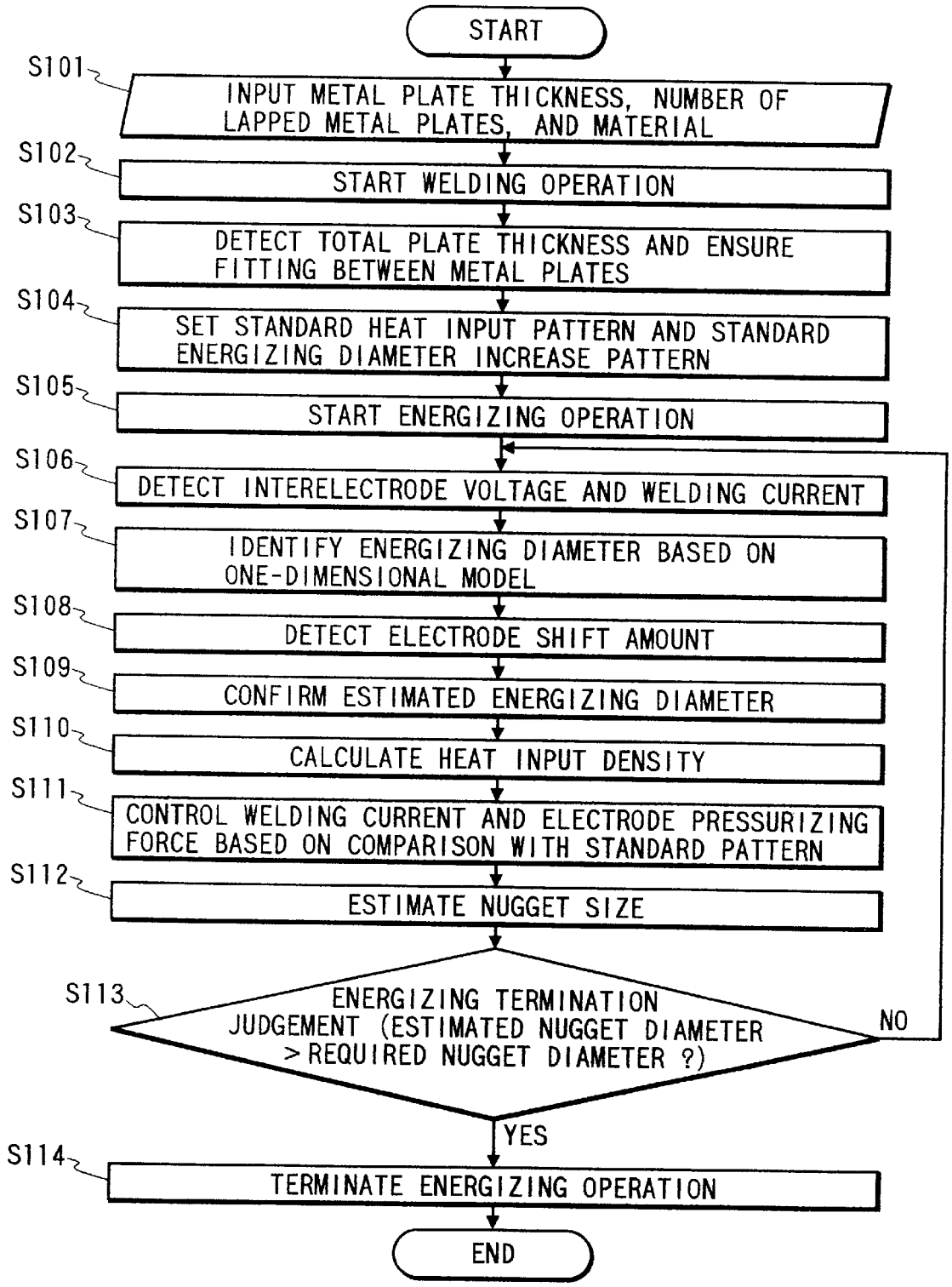
FIG. 5 is a flow chart showing an operation of the conventional control apparatus for a resistance welding machine.

Furthermore, according to the first embodiment, the present nugget diameter is estimated based on the energizing diameter, the temperature distribution, and the heat input density obtained according to the method similar to the conventional method expressed by steps 106 through 110 of FIG. 5. However, it is possible to detect at least one of the welding current, the interelectrode voltage and the interelectrode distance and then estimate the nugget diameter in accordance with the correlation between the nugget growth and the change of the detected value itself or a combination of detected values (e.g. a resistance value obtained by dividing a detected voltage by a detected current).

Still further, according to the first embodiment, the nugget size is expressed by the diameter for use in the settings, estimations, or predictions. However, it is of course possible to express the nugget size by the thickness, volume or temperature distribution region.

Moreover, the first embodiment adopts the welding current control using a thyrister. Needless to say, it is possible to adopt other control method such as an inverter method.

As explained in the foregoing description, the first embodiment invention provides a control apparatus for a resistance welding machine, comprising setting nugget input means, present nugget estimating means, nugget growth predicting means for predicting a nugget growth curve after a present time and a required energizing time for the predicted nugget growth, current control judgement means for generating a control signal used for controlling a welding current so as to equalize the required energizing time with a recommendable energizing time, and control means for controlling the welding current.

With this arrangement, the present invention allows each welding machine operator to input a required nugget size directly for setting the welding condition instead of inputting various data for the welding conditions, including the welding current and the energizing time, with reference to a predetermined welding condition table and further without requiring expert correction thereon. Thus, it becomes possible to reduce the burden of the welding machine operator, such as requisite expertise. Thus, it becomes possible to provide an excellent control apparatus for a resistance welding machine capable of always producing a preferable nugget having a predetermined strength regardless of the machining accuracy of the base metals to be welded and wear of the welding electrodes.

Hereinafter, a second embodiment of the present invention will be explained with reference to the accompanying drawings.

Figure 6:
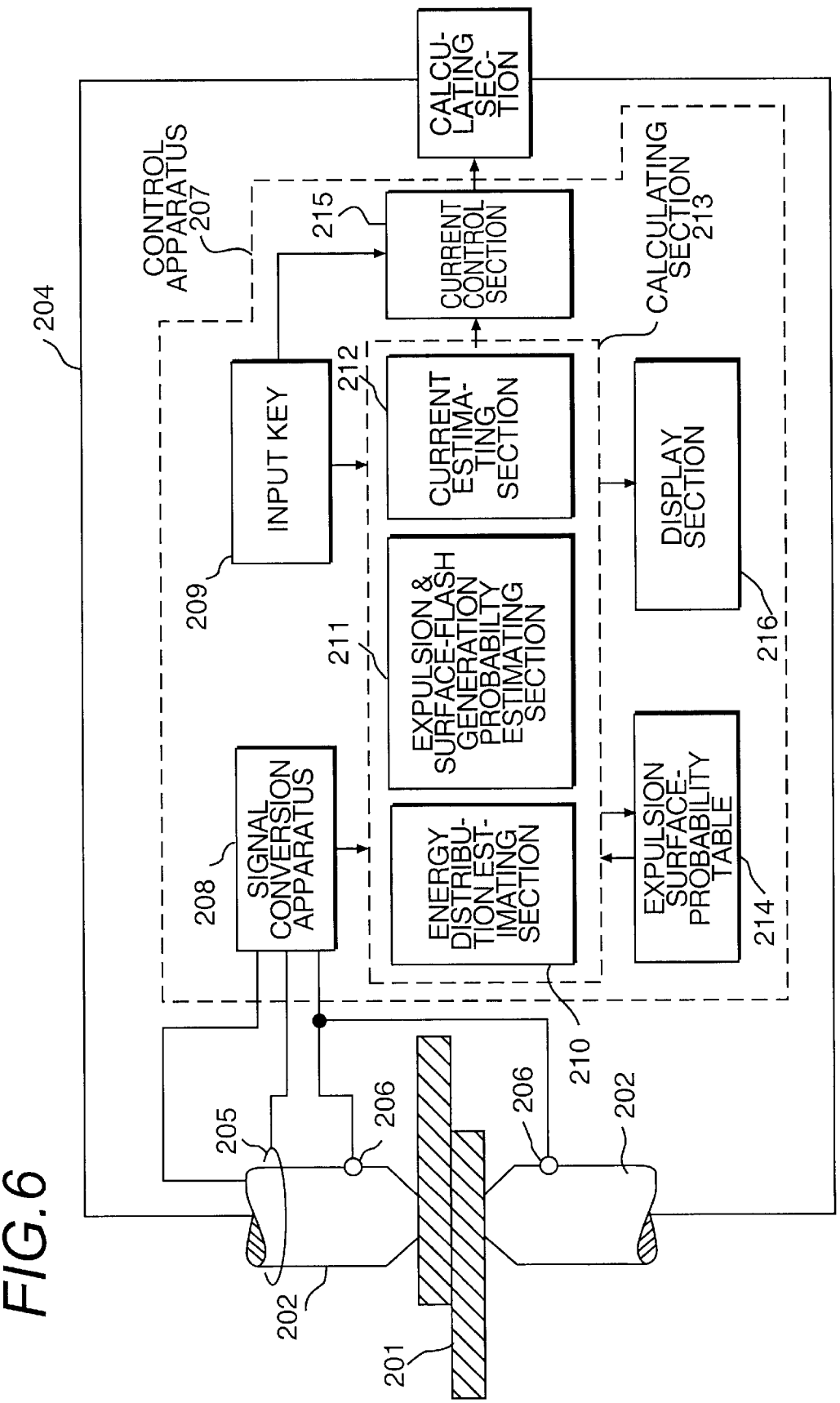
FIG. 6 is a block diagram showing an arrangement of a control apparatus for a resistance welding machine in accordance with a second embodiment of the present invention.

In FIG. 6, reference numeral 201 represents base metals to be welded, and reference numeral 202 represents a pair of welding electrodes which holds or clamps the base metals 201 and is pressurized by an appropriate pressurizing mechanism (not-shown) to supply welding current to the welding portion. Reference numeral 203 represents a welding power source unit which generates the welding current. Reference numeral 204 represents a secondary conductor connecting the welding power source unit 203 and electrodes 202.

Reference numeral 205 represents a welding current detecting device which is, for example, constituted by a toroidal coil or a current shunt and a detecting wire. Reference numeral 206 represents an interelectrode voltage detecting device which may comprise a detecting wire connected to a predetermined position of the electrode 202 or an electrode holder (not shown).

Reference numeral 207 represents a control apparatus. Control apparatus 207 comprises the following components. Reference numeral 208 represents a signal conversion section which converts the output signals of the welding current detecting device 205 and the interelectrode voltage detecting device 206 into data signals processible in the control apparatus 207. Reference numeral 209 represents an input key. A calculating section 213 consists of an energy distribution estimating section 210, an expulsion & surface-flash generation probability estimating section 211 and an optimum welding current estimating section 212. Reference numeral 214 represents an expulsion & surface-flash generation probability table obtained based on the experiments conducted by the inventors. Reference numeral 215 represents a welding current control section. And, reference numeral 216 represents a display section 216. The optimum welding current estimating section 212 and the welding current control section 215 cooperatively constitute heat input control section.

Furthermore, the control apparatus 207 comprises other components, such as a timer used for setting a welding timer and controlling the welding operation, a pattern generating section for executing a pattern control for the welding current, and a pressurizing force control section. These component are not directly related to the present invention but conventionally well-known and, therefore, are not shown in the drawing and not explained in the following description.

Figure 7:
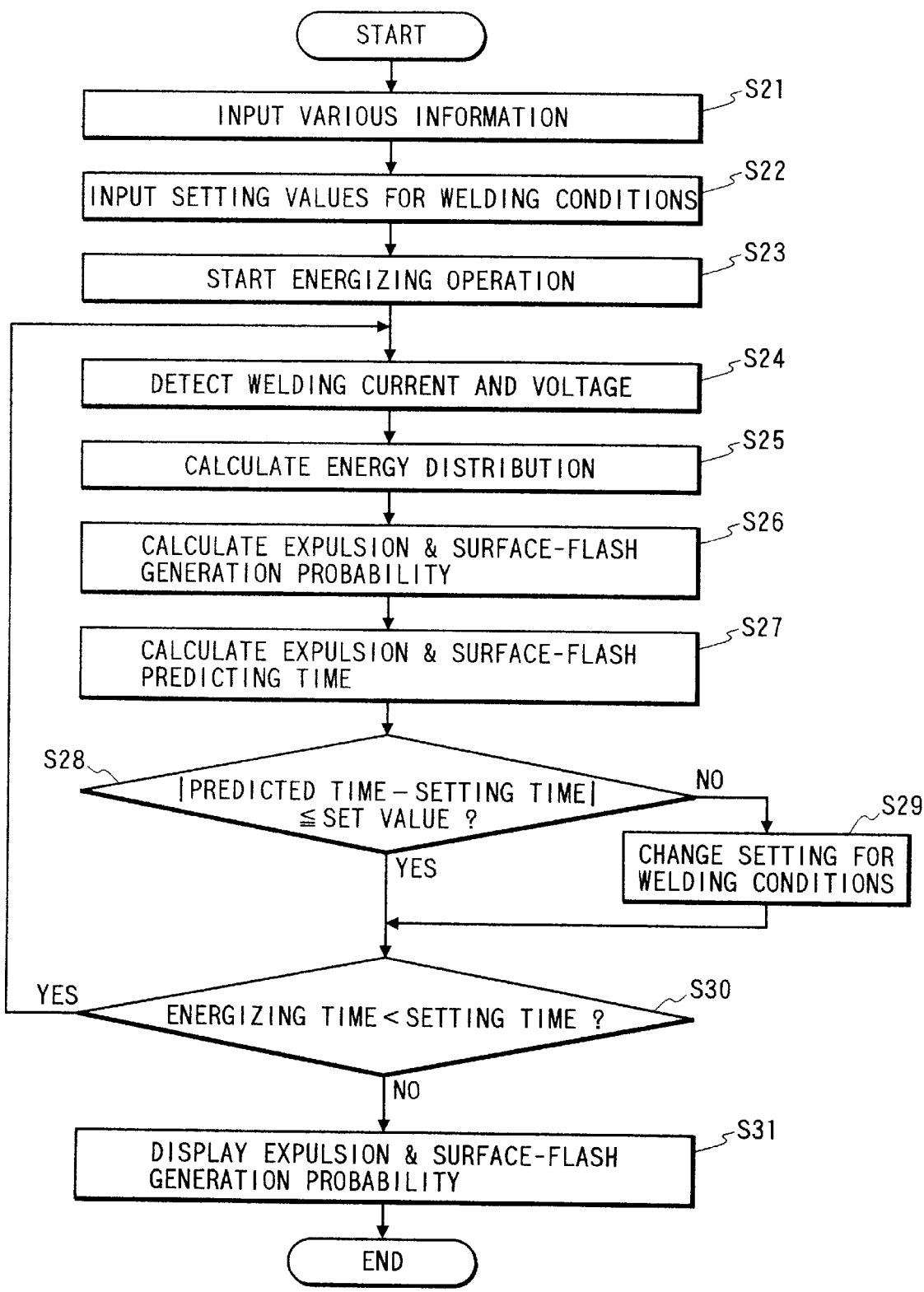
FIG. 7 is a flow chart showing an operation of the control apparatus of the second embodiment of the present invention.

An operation of the above-described control apparatus for a resistance welding machine in accordance with the second embodiment will be explained with reference to FIG. 7. First, information (e.g. material, plate thickness, lapping number, etc) relating to base metal 201 given by a design package or specification are entered through input key 209. Furthermore, information (material, tip configuration etc.) relating to the used welding electrodes 202 are entered through input key 209, too. Subsequently, welding conditions (welding current, pressurizing force, welding time. etc.) are entered (Steps 21 and 22).

After finishing the above-described preparation, base metals 201 are sandwiched or clamped between a pair of upper and lower electrodes 202 to start the welding operation. A predetermined pressurizing force is applied between electrodes 202. Then, a welding current is supplied. The welding current value is determined in accordance with the welding conditions previously set (step 23). After starting the energizing operation, the welding current detecting device 205 detects a momentary value of the welding current and the interelectrode voltage detecting device 206 detects a momentary value of the interelectrode voltage (step 24). Then, the signal conversion section 208 converts these detected values into data signals processible in the control apparatus 207. These data signals are supplied to the calculating section 213.

In the calculating section 213, the energy distribution estimating section 210 estimates an energy distribution based on the detected momentary data representing the welding current and the interelectrode voltage (step 25).

Figure 8:
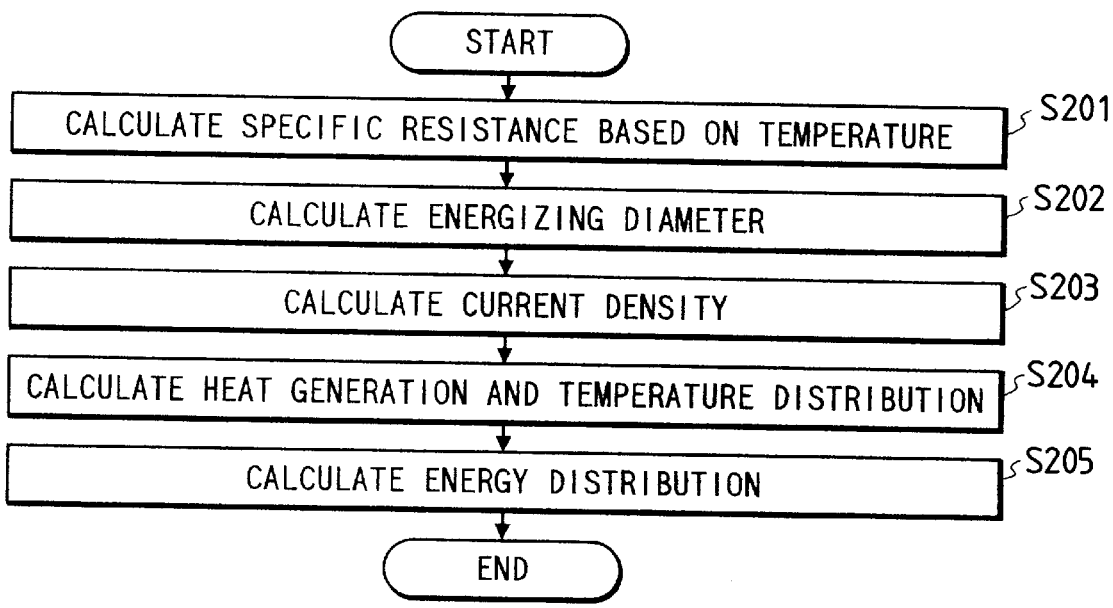
FIG. 8 is a flow chart showing a procedure for estimating an energy distribution, performed by the control apparatus of the second embodiment of the present invention.
Figure 9A:
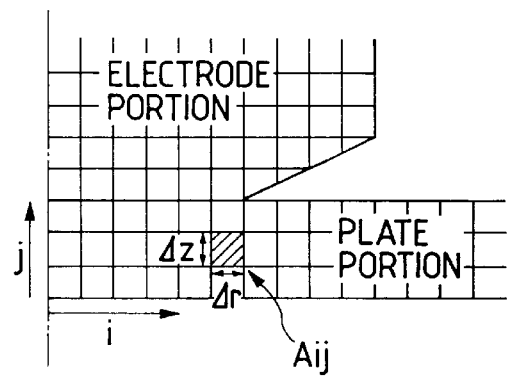
FIG. 9A is a view illustrating micro sections dissected along a cross section of a welding portion in accordance with the second of the present invention.
Figure 9B:
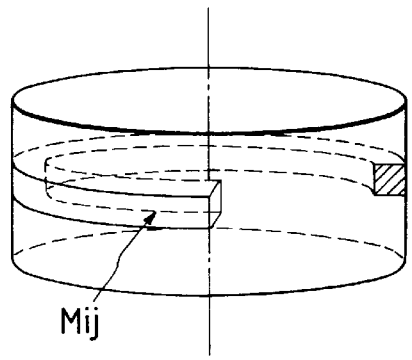
FIG. 9B is a view illustrating an annular 3-D section in accordance with the second embodiment of the present invention.

Estimation of the energy distribution (step 25) is performed in the following manner. As shown in FIG. 9A, the cross section of the welding portion is dissected into a plurality of micro lattice sections Aij (i=1, 2, - - - ; j=1, 2, - - - ) each having a size of Δr·Δz. FIG. 9B shows an annular 3-D section Mij obtained by rotating the above micro lattice section Aij by an angle of 360° about the central axis of the electrode 202. FIG. 8 is a flow chart used for obtaining numerical values representing the specific resistance, electrical potential, temperature, and energy in each annular 3-D section Mij.

More specifically, the specific resistance of each annular 3-D section is determined based on the temperature distribution in the welding portion (step 201). At the moment the energizing operation is just started, the specific resistance is equal to a specific resistance at the room temperature in every annular 3-D section. In the calculation, it is assumed that there is no significant changes in the values of the temperature and the specific resistance during a small time interval Δt.

Next, a mean specific resistance in the energizing section is obtained as a composite specific resistance of all annular 3-D sections. All of data representing the mean specific resistance thus obtained, the welding current and the interelectrode voltage detected previously are entered into the following equation (4) to calculate an energizing diameter (step 202). The obtained energizing diameter determines the region of succeeding calculations which are executed within this energizing diameter.

$$Dc = \sqrt{\frac{4}{\pi} \frac{\rho m \cdot A \cdot \Sigma hi}{Rtip - R0}} \quad (4)$$

where "Dc" is a representative energizing diameter of a welding portion (m), "ρm" is a mean specific resistance of the welding portion (Ω·m), "A" is a correction coefficient relating to current spread, "Σhi" is a total plate thickness (m), "Rtip" is an interelectrode resistance (=Vtip/I when "Vtip" is an interelectrode voltage and "I" is a welding current) (Ω), and "R0" is an electrode resistance (Ω).

Next, the electrical potential in each annular 3-D section is calculated in accordance with the following equation (5). Then, using the electrical potential thus obtained, the current density in each annular 3-D section is calculated in accordance with the following equation (6) (step 203). Furthermore, using the calculated current density and the specific resistance, the temperature distribution in each annular 3-D section is calculated in accordance with the following equation (7) (step 204). Then, referring to this temperature distribution, the energy distribution in each annular 3-D section is calculated (step 205). These calculations are repetitively performed by the S.O.R method, until the resultant data are converged to specific values. The energy distribution estimating section 210 sends this energy distribution to the expulsion & surface-flash generation probability estimating section 211, and determines a specific resistance in each annular 3-D section based on the newly obtained temperature distribution (step 201). Then, using the welding current and the interelectrode voltage newly detected, the above-described calculations are repeated.

$$\nabla \cdot (K \nabla V) = 0 \quad (5)$$

where "i" is a lattice number in the radial direction, "j" is a lattice number in the axial direction, "k(i.j)" is an electric conductivity in an annular micro section Mi, j (Ω/m), and "V(i,j)" is a voltage in the micro section Mi,j (V).

$$\delta^2 = \frac{1}{(\rho \times 1)^2} \cdot |grad\ V|^2 \quad (6)$$

where δ is a current density (A/m²), π is a specific resistance (m), 1 is a lattice clearance (m), and V is a potential difference (V/m).

$$c\sigma \frac{\partial T}{\partial t} = \nabla(\nabla kT) + \rho \delta 2 \quad (7)$$

where "c" is a specific heat (cal/kg), "σ" is a density (kg/m³), "k" is a heat conductivity, "k" is a heat conductivity, "δ" is a current density (≡AI/(π·Dc²/4)), "A" is a correction coefficient relating to current spread, "I" is a welding current (A), "T" is a temperature, "t" is a time, and "∇" is a partial derivative symbol.

The expulsion & surface-flash estimating section 211 estimates an expulsion & surface-flash generation probability corresponding to the energy distribution calculated by the energy distribution estimating section 210 with reference to the expulsion & surface-flash generation probability table 214 (step 26). The expulsion & surface-flash generation probability table 214 was obtained experimentally by the inventors based on the fact that the expulsion & surface-flash generation probability is substantially determined by an amount of unavailable energy stored in a contact area in the periphery of a nugget.

The unavailable energy amount is equal to a difference between the total energy supplied from the welding power unit 203 to the welding portion and the sum of an effective energy amount contributing the growth of the nugget, a heat transfer loss in the base metals 201, and other energy lost by electrode cooling water or radiated into the air. More specifically, according to the expulsion & surface-flash generation probability table 214, the expulsion & surface-flash generation probability is given as a function of the unavailable energy in various combinations of base metals 201 and electrodes 202, so as to be somewhere in a range from 0 to 100(%). Ordinarily, the expulsion & surface-flash generation probability increases in accordance with the progress of the welding operation. It is believed that the expulsion & surface-flash is generated when the probability reaches 100(%).

The expulsion & surface-flash generation probability estimating section 211 extrapolates the curve representing the expulsion & surface-flash generation probability which increases in accordance with the progress of the welding operation, and predicts the expulsion & surface-flash generation time (i.e. a time an expulsion & surface-flash is generated for the first time) in a case where the welding operation is continuously performed under the welding conditions initially set (step 27). It is desirable that the expulsion & surface-flash generation time comes immediately after the setting welding time has elapsed. When the expulsion & surface-flash generation time comes earlier than the setting welding time, it is considered that the welding current is excessively large and there is a possibility that any expulsion & surface-flash may be generated during the present welding operation. On the other hand, when the expulsion & surface-flash generation time comes too much lately than the setting welding time, the welding current is excessively small and a nugget having a satisfactory size cannot be obtained.

In view of the foregoing, the optimum welding current estimating section 212 compares the predicted expulsion & surface-flash generation time with the welding time initially set at a predetermined time, and estimates an optimum value for the welding current to be supplied during the succeeding welding operation (step 28). The estimated optimum welding current value is sent to the welding current control section 215. The welding current control section 215 changes the welding current value in accordance with the optimum welding current value (step 29). Meanwhile, the estimation of the optimum welding current by the optimum welding current estimating section 212 is forcibly started by considering the remaining time for the welding operation whenever the expulsion & surface-flash generation probability reaches 80%. Then, the command signal for changing the welding current is generated at a time corresponding to two cycles after the moment the expulsion & surface-flash generation probability reached 80%.

The welding current control section 215 stops the energizing operation when the total energizing time reaches the welding time initially set (step 30). After stopping the energizing operation, the display section 216 displays the finally predicted expulsion & surface-flash generation time of the welding operation completed (step 31). This value is referred in the setting of the next welding conditions.

As explained in the foregoing description, the above-described second embodiment comprises the welding current detecting device 205 for detecting the welding current, the interelectrode voltage detecting device 206, the signal conversion section 208 which converts the outputs of welding current detecting device 205 and interelectrode voltage detecting device 206 into data signals processible in the control apparatus 207, the input key 209, the calculating section 213 consisting of energy distribution estimating section 10, expulsion & surface-flash generation probability estimating section 211 and optimum welding current estimating section 212, the expulsion & surface-flash generation probability table 214, and the welding current control section 15. The energy distribution is estimated based on the momentary values of the welding current and the interelectrode voltage.

Then, both the expulsion & surface-flash generation probability and the expulsion & surface-flash generation time are estimated from the energy distribution thus obtained. Then, the welding current is controlled to accomplish an adjustment such that the predicted expulsion & surface-flash generation time comes immediately after the termination of the setting welding time. Thus, the heat input amount can be increased up to the maximum level without causing any expulsion & surface-flash, thereby obtaining a desirable nugget having the maximum strength.

According to the above-described second embodiment, the welding current control is performed at the predetermined time or at the time corresponding to two cycles after the moment the expulsion & surface-flash generation probability reaches 80%. However, the timing for the welding control can be flexibly changed. Hence, there is no necessity of limiting the welding current control timing to a specific time, such as the time corresponding to two cycles after the 80% reaching moment. Furthermore, instead of controlling the welding current, it will be possible to control other welding conditions, such as the pressurizing force and the welding time, which give a significant effect on the determination of the heat input amount.

Furthermore, instead of varying the welding conditions during the concerned welding operation, it will be possible to change the welding conditions for the next welding operation with reference to the predicted expulsion & surface-flash generation time displayed on the display section 216. Still further, according to the above-described second embodiment, the display section 216 displays the finally predicted expulsion & surface-flash time when the concerned welding operation is completed. Needless to say, it is preferable to display an expulsion & surface-flash generation probability at a time immediately before stopping the energizing operation or at any arbitrary time, or a value resultant from statistic or comparison processing on these data, or a hysteresis curve representing an increase of the expulsion & surface-flash probability. It is also preferable to use these data as reference values.

Yet further, in FIG. 6, the welding current detecting device 205 is constituted by a toroidal coil or a current shunt. However, it is possible to measure the primary current of a transformer of the welding power source unit 203 to detect the welding current.

Hereinafter, a demonstration result of the present invention will be explained in more detail.

According to an experiment conducted by the inventors, galvanized sheet irons of 1.2 mmt is used as the lapped base metals 201. A total energizing time was set to 20 cycles. The pressurizing force was set to 320 kgf. The welding current was first set at 8 kA for a duration of 6 cycles and then increased to 14 kA after the passage of this duration. When the expulsion & surface-flash generation probability reaches 80%, the welding current is reduced at a time corresponding to 2 cycles after the 80% reaching moment.

Figure 11:
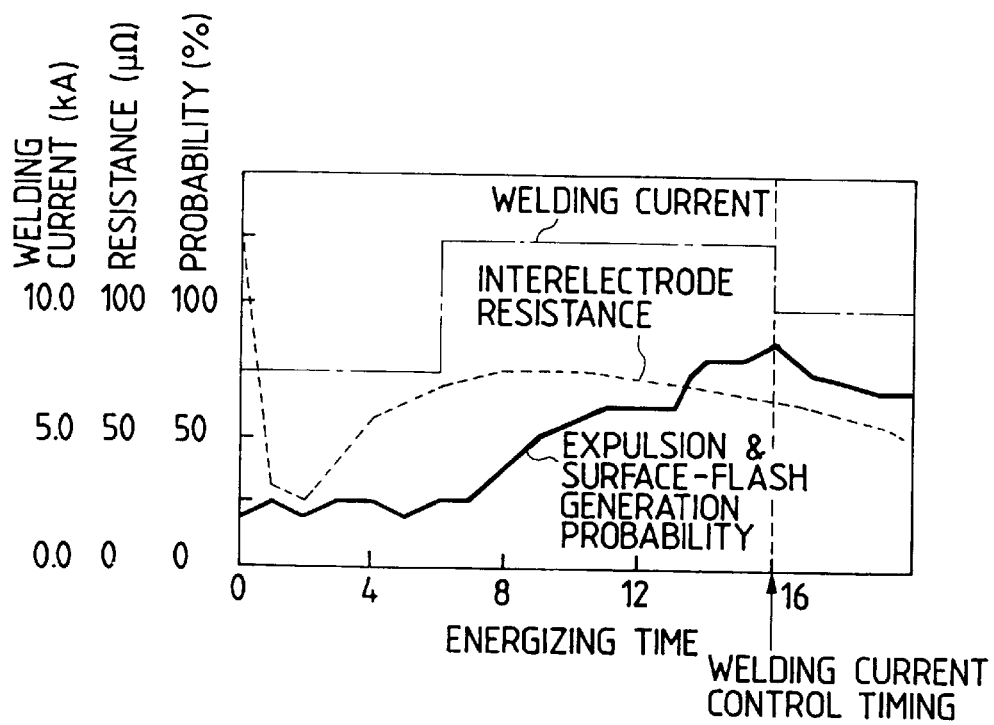
FIG. 11 is a graph showing a time variation of the expulsion & surface-flash generation probability in accordance with the second embodiment of the present invention.

FIG. 11 shows a curve representing a time variation of the expulsion & surface-flash generation probability in this experiment, in comparison with curves representing the welding current and the interelectrode resistance. As shown in FIG. 11, the expulsion & surface-flash generation probability reached 80% at the time corresponding to 14 cycles. The welding current is reduced to 10 kA at the time corresponding to 2 cycles after the 80% reaching moment (i.e. the time corresponding to 14 cycles). As a result of this precise welding current control, generation of the expulsion & surface-flash was surely prevented.

Figure 10:
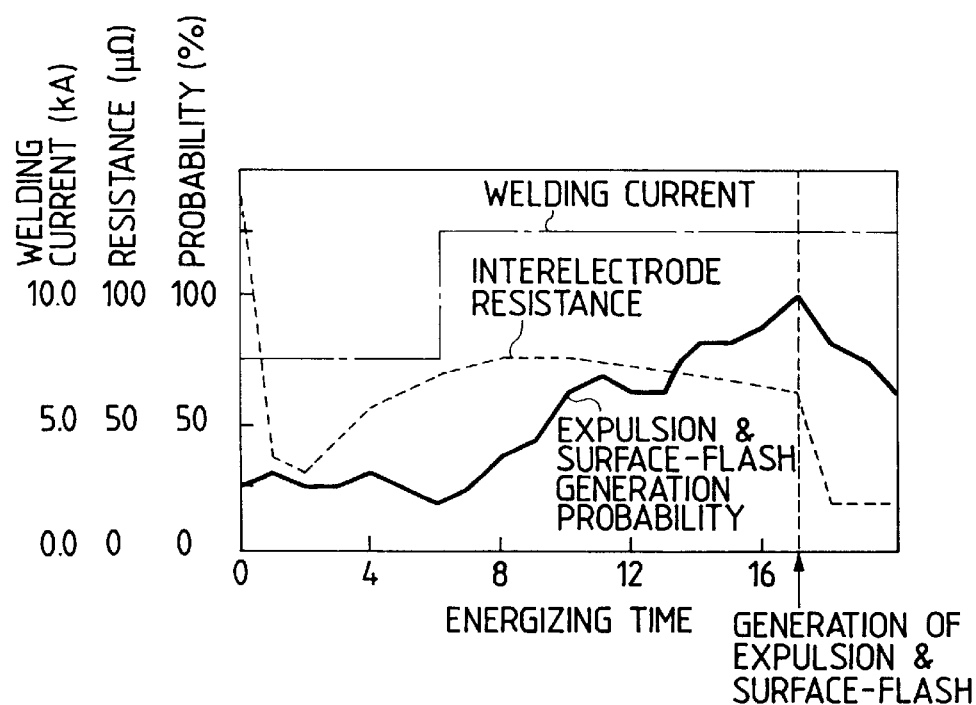
FIG. 10 is a graph showing a time variation of the expulsion & surface-flash generation probability in accordance with a conventional welding operation.

FIG. 10 shows one example of a welding operation not relying on the precise welding current control of the present invention, but was performed under the same welding conditions as those of the welding operation of FIG. 11. As shown in FIG. 10, the expulsion & surface-flash generation probability has increased with elapsing energizing time. At the time corresponding to 17 cycles, an expulsion & surface-flash was generated. Occurrence of this expulsion & surface-flash was recognized by the steep drop of the interelectrode resistance.

Furthermore, according to the above-described welding operation not relying on the welding current control of the present invention, a reduction of the welding strength by an amount of 90% to 70% was found at the welding point which caused an expulsion & surface-flash, compared with the welding strength of a normal welding point free from generation of the expulsion & surface-flash. On the contrary, according to the welding operation incorporating the welding current control of the present invention, dispersion of the welding strength at each welding point was small and the welding strength value was maintained at a higher level of 95% or above.

As explained in the foregoing description, the present invention makes it possible to predict the generation of any expulsion & surface-flash in advance. Thus, the heat input amount can be increased up to the maximum level without causing any expulsion & surface-flash, thereby obtaining an excellent nugget having the maximum strength.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A control apparatus for a resistance welding machine, comprising:

setting nugget input means for inputting a setting nugget size;

nugget estimating means for estimating a size of a nugget being formed;

nugget growth predicting means for predicting a nugget growth curve after a certain time interval and a required welding time for the predicted nugget growth;

current control judgement means for generating a control signal to equalize the required welding time with a recommended welding time; and control means for controlling a welding current in accordance with said control signal.

2. The control apparatus for a resistance welding machine in accordance with claim 1, further comprising deenergizing judgment means for generating a deenergizing signal to stop welding when the present nugget size estimated by said present nugget estimating means becomes equal to said setting nugget size set by said setting nugget input means.

3. The control apparatus for a resistance welding machine in accordance with claim 1, further comprising detecting means for detecting at least one of the welding current, interelectrode voltage, and interelectrode distance during a welding operation, wherein said present nugget estimating means estimates the size of the present nugget growing during the welding operation based on variation of said at least one of the welding current, interelectrode voltage, and interelectrode distance detected by said detecting means.

4. The control apparatus for a resistance welding machine in accordance with claim 1, further comprising condition input means for inputting information relating to a base metal, recommendable condition memory means, and welding condition setting means for automatically setting initial welding conditions suitable for said base material.

5. The control apparatus for a resistance welding machine in accordance with claim 4, wherein said present nugget estimating means uses a correction table in the correction of said present nugget estimated based on the information relating to the base metal.

6. The control apparatus for a resistance welding machine in accordance with claim 1, further comprising abnormality warning means for generating an alarm when the required energizing time obtained by said nugget growth predicting means, or one of a difference and a ratio between the recommendable energizing time and a time interval from start of energizing to generation of the deenergizing signal, is not within a predetermined region.

7. A control apparatus for a resistance welding machine, comprising:

welding current detecting means for detecting a welding current;

interelectrode voltage detecting means for detecting an interelectrode voltage;

energy distribution estimating means for estimating an energy distribution in a portion being welded based on time variations of the welding current and the interelectrode voltage detected by said welding current detecting means and said interelectrode voltage detecting means; and expulsion & surface flash generation probability estimating means for estimating an expulsion & surface-flash generation probability based on said energy distribution obtained by said energy distribution estimating means and for supplying a control signal to said welding machine based on said estimated probability.

8. The control apparatus for a resistance welding machine in accordance with claim 7, further comprising heat input control means for controlling a welding heat input amount so as to maintain said expulsion & surface-flash generation probability at a predetermined value.

9. The control apparatus for a resistance welding machine in accordance with claim 8, wherein said heat input control means comprises:

optimum welding current estimating means for generating a control signal representing an optimum welding current value, and welding current control means for controlling the welding current in accordance with said control signal produced from said optimum welding current estimating means.

10. The control apparatus for a resistance welding machine in accordance with claim 7, wherein said expulsion & surface-flash generation probability estimating means comprises expulsion & surface-flash generation time predicting means for predicting an expulsion & surface-flash generation time, and heat input control means for controlling a welding heat input amount so that said expulsion & surface-flash generation time is in a predetermined period of time after finishing a welding operation.

11. The control apparatus for a resistance welding machine in accordance with claim 10, wherein said heat input control means comprises:

optimum welding current estimating means for generating a control signal representing an optimum welding current value, and welding current control means for controlling the welding current in accordance with said control signal produced from said optimum welding current estimating means.

12. The control apparatus for a resistance welding machine in accordance with claim 7, further comprising display means for displaying at least one of said expulsion & surface-flash generation probability estimated by said expulsion & surface-flash generation probability estimating means, said expulsion & surface-flash generation time predicted by said expulsion & surface-flash generation time predicting means, and a processing result of data relating to said expulsion & surface-flash generation probability and said expulsion & surface-flash generation time.

* * * * *